(12) United States Patent
Wang et al.

(10) Patent No.: US 11,585,467 B2
(45) Date of Patent: Feb. 21, 2023

(54) TRENCHLESS METHODS FOR FORMING CURVED HOLE CHANNEL WITH STEEL SLEEVE AND PIPELINE LIFTING

(71) Applicants: Infrastructure Renewal Institute of Southern China, Guangdong (CN); WELEAD Infrastructure Engineering Technology (Zhengzhou), Ltd.

(72) Inventors: Fuming Wang, Guangdong (CN); Hongyuan Fang, Guangdong (CN); Peng Zhao, Henan (CN); Yanhui Pan, Henan (CN); Bin Li, Henan (CN); Hang He, Henan (CN)

(73) Assignees: Infrastructure Renewal Institute of Southern China, Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 366 days.

(21) Appl. No.: 16/871,029

(22) Filed: May 10, 2020

(65) Prior Publication Data

US 2020/0271245 A1 Aug. 27, 2020

(30) Foreign Application Priority Data

Sep. 25, 2019 (CN) .......................... 201910911280.4

(51) Int. Cl.
*F16L 55/175* (2006.01)
*F16L 55/18* (2006.01)
(Continued)

(52) U.S. Cl.
CPC ................. *F16L 7/02* (2013.01); *E21B 7/00* (2013.01); *E21B 19/00* (2013.01)

(58) Field of Classification Search
CPC . F16L 55/175; F16L 55/18; F16L 7/00; F16L 7/02; F16L 1/028; E03F 3/06; E03F 2003/065; E21B 7/00; E21B 19/00
See application file for complete search history.

(56) References Cited

U.S. PATENT DOCUMENTS

| 1,367,042 A | * | 2/1921 | Granville | ................ E21B 7/061 |
| | | | | 175/320 |
| 2,198,016 A | * | 4/1940 | Rogers | .................... E21B 7/061 |
| | | | | 175/320 |

(Continued)

FOREIGN PATENT DOCUMENTS

| CM | 107829422 A | * | 3/2018 | ............... E02D 3/00 |
| CN | 108396729 A | * | 8/2018 | |
| FR | 2696811 A1 | * | 4/1994 | ............... E03F 3/06 |

*Primary Examiner* — Benjamin F Fiorello
*Assistant Examiner* — Stacy N Lawson

(57) ABSTRACT

Trenchless methods for forming a curved hole channel with a steel sleeve and pipeline lifting are provided, including steps of: (T1) drilling a straight hole channel, and inserting the steel sleeve into the straight hole channel; (T2) inserting a guiding pipe into the steel sleeve, and determining a bending direction of a hole channel to be formed; and (T3) inserting a flexible steel-wire pipe into the guiding pipe, and punching to form the curved hole channel. With applying the creative trenchless method for forming the curved hole channel, a specially-made grouting pipe is accurately inserted to a bottom of a subsiding pipeline section, so that a polymer material is conveniently injected to a bottom of a disease position. Though utilizing an expansion force generated by the polymer material, the subsiding pipeline section is uplifted, so as to realize trenchless repairing.

7 Claims, 5 Drawing Sheets

(51) Int. Cl.
*E21B 7/06* (2006.01)
*E03F 3/06* (2006.01)
*F16L 7/02* (2006.01)
*E21B 7/00* (2006.01)
*E21B 19/00* (2006.01)

(56) References Cited

U.S. PATENT DOCUMENTS

| | | | | |
|---|---|---|---|---|
| 4,007,797 | A | * | 2/1977 | Jeter ........................ E21B 4/00 |
| | | | | 175/81 |
| 4,527,639 | A | * | 7/1985 | Dickinson, III ...... E21B 43/281 |
| | | | | 166/50 |
| 2016/0169435 | A1 | * | 6/2016 | Wang .................... F16L 55/175 |
| | | | | 405/184.1 |

* cited by examiner

TRENCHLESS METHODS FOR FORMING CURVED HOLE CHANNEL WITH STEEL SLEEVE AND PIPELINE LIFTING

CROSS REFERENCE OF RELATED APPLICATION

The application claims priority under 35 U.S.C. 119(a-d) to CN 201910911280.4, filed Sep. 25, 2019.

BACKGROUND OF THE PRESENT INVENTION

Field of Invention

The present invention relates to a repairing technology for concrete drainage pipeline, and more particularly to trenchless methods for forming a curved hole channel with a steel sleeve and pipeline lifting.

Description of Related Arts

The drainage pipeline network as one of the important urban infrastructures bears the functions of sewage discharge and drainage, and is the underground lifeline which guarantees the normal operation of the overall urban function. China has the vast territory and complex geological conditions that soil layers of silt, silty clay, soft soil and collapsible loess are widely distributed. When conducting the drainage pipe construction in the above areas, if the foundation is improperly treated, the uneven settlement of the pipeline foundation caused by the foundation defects easily occurs, causing the subsidence and misalignment of the pipeline joint. If not treated in time, the joint misalignment will cause the pipeline leakage that the sewage in the pipeline leaks and the surrounding soil gradually becomes hollow, further causing the environmental pollution and the accident such as the urban road collapse, which seriously affects the ecological environment and the travel safety of the residents.

The conventional concrete drainage pipeline trench repairing method in China affects the traffic, wastes the resources and pollutes the environment, and there generally lacks the trench construction conditions due to the complex urban ground conditions. The trenchless repairing technologies such as the insertion method, the in-situ solidification method, the winding method and the pipe splitting method are just getting started in China and have the high cost. Moreover, the above technologies can only repair the own structural diseases of the pipeline such as cracks and corrosions, but cannot effectively repair the external diseases of the pipeline such as subsidence and disengagement.

The Chinese patent application of CN 201510069861.X disclosed a trenchless repairing method for settlement of the underground pipeline. The disclosed polymer bag grouting method for repairing the settlement of the underground pipeline is applicable to the large-diameter (with the nominal diameter larger than or equal to 800 mm) drainage pipeline. After people enter the pipeline, the pipeline is firstly drilled from inside to outside; then, the bag is embedded and the polymer material is injected into the bag, so as to repair the settlement of the pipeline. However, during the repairing process with the above method, the water supply is required to be cut off, so that people enter the pipeline to conduct the repairing works; the construction conditions are difficult, and a poisoning risk exists; and the above method is only applicable to the settlement repairing for the pipeline having the nominal diameter larger than 800 mm, so that the method cannot be applied into the trenchless repairing for the subsidence disease of the small-diameter (with the nominal diameter smaller than 800 mm) concrete drainage pipeline.

The major technical problem is that: there is no corresponding technology can inject the polymer material to the bottom of the subsiding pipeline section without entering the pipeline by people or trenching, which greatly limits the disease repairing. Thus, it is urgent to develop a trenchless repairing method for the subsidence disease of the small-diameter (with the nominal diameter smaller than 800 mm) concrete drainage pipeline.

SUMMARY OF THE PRESENT INVENTION

An object of the present invention is to provide trenchless methods for forming a curved hole channel with a steel sleeve and pipeline lifting, which are able to construct the curved hole channel in a trenchless way and repair a subsidence disease of a small-diameter concrete drainage pipeline in the trenchless way, so as to overcome deficiencies in prior art.

In order to accomplish the above object, the present invention adopts technical solutions as follows.

A trenchless method for forming a curved hole channel with a steel sleeve is provided, comprising steps of:

(T1) drilling a straight hole channel, and inserting the steel sleeve into the straight hole channel;

(T2) inserting a guiding pipe into the steel sleeve, and determining a bending direction of a hole channel to be formed; and (T3) inserting a flexible steel-wire pipe into the guiding pipe, and punching to form the curved hole channel.

Preferably, the guiding pipe is a rubber pipe with a curved tail end.

Preferably, the flexible steel-wire pipe has a three-layer structure, comprising an inner layer, a middle layer, and an outer layer, wherein: the inner layer and the outer layer are made of Poly Vinyl Chloride (PVC) soft plastic; and the middle layer is steel wires.

The present invention further provides a trenchless method for pipeline lifting based on the trenchless method for forming the curved hole channel with the steel sleeve, comprising steps of:

(S1) detecting a pipeline, and determining a position of a subsiding pipeline section;

(S2) selecting a position of a grouting hole at ground of a side of the subsiding pipeline section, and extending a hole channel of the grouting hole to a bottom of the subsiding pipeline section with the trenchless method for forming the curved hole channel with the steel sleeve;

(S3) pulling out the flexible steel-wire pipe; inserting a grouting pipe into the guiding pipe, and then inserting the grouting pipe to the bottom of the subsiding pipeline section; and (S4) injecting a polymer material to the bottom of the subsiding pipeline section through the grouting pipe, so as to uplift and reset the subsiding pipeline section.

Preferably, in the step of S1, a device used for detecting the pipeline is a pipeline video robot.

Preferably, in the step of S2, a depth of the grouting hole is from the ground to a height of a central axis of an outer wall of the subsiding pipeline section.

Preferably, the step of S4 particularly comprises steps of:

(S41) injecting the polymer material to the bottom of the subsiding pipeline section through the grouting pipe by a grouting device; and (S42) filling a subsidence area with the polymer material, then expanding and solidifying, and gradually uplifting the subsiding pipeline section.

Further preferably, in the step of S41, a grouting head is connected between the grouting device and the grouting pipe.

Further preferably, the grouting head comprises a fixing clamp, a grouting device connection pipe and a grouting connection pipe, wherein: the grouting device connection pipe is connected with the grouting device; and the grouting connection pipe is connected with the grouting pipe.

Preferably, the trenchless method for pipeline lifting further comprises steps of:

(S5) after completing resettlement of the subsiding pipeline section, reinforcing and stabilizing surrounding soil of the subsiding pipeline section; after completing reinforcing, successively taking out the grouting pipe, the guiding pipe and the steel sleeve from the grouting hole; and grouting for sealing the grouting hole.

Compared with the prior art, the trenchless methods for forming the curved hole channel with the steel sleeve and pipeline lifting provided by the present invention have beneficial effects as follows.

In the techniques for repairing the subsidence of the small-diameter concrete drainage pipeline, the new method provided by the present invention not only effectively avoids the disadvantages brought by the trench repairing, but also has the clearer goal orientation and more thorough treatment effect compared with the other trenchless repairing methods. With applying the creative trenchless method for forming the curved hole channel, the specially-made grouting pipe is accurately inserted to the bottom of the subsiding pipeline section. Combined with the polymer grouting technology, the polymer material is conveniently injected to the bottom of the disease position. Though utilizing the expansion force generated by spreading, filling, expanding and solidifying of the polymer material at the subsidence area, the subsiding pipeline section is uplifted, so as to realize the trenchless repairing.

DETAILED DESCRIPTION OF THE PREFERRED EMBODIMENT

Figure 1A:
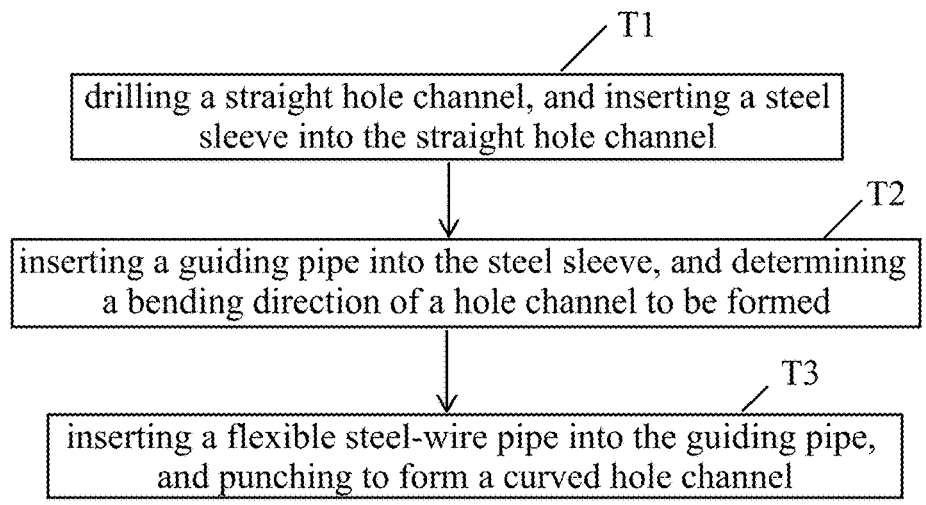
FIG. 1(a) is a flow chart of a trenchless method for forming a curved hole channel with a steel sleeve according to the present invention.
Figure 1B:
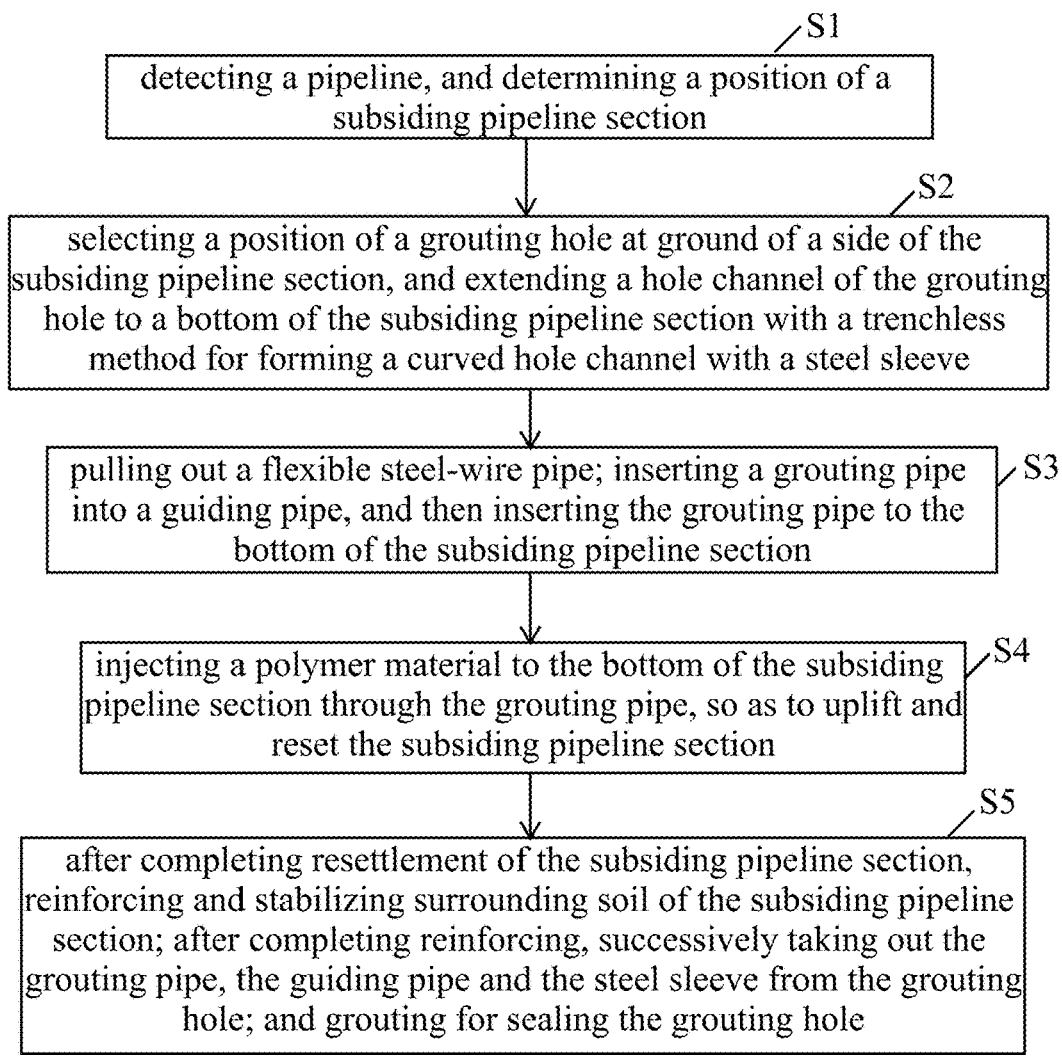
FIG. 1(b) is a flow chart of a trenchless method for pipeline lifting according to the present invention.

In order to make objects, technical solutions and effects of the present invention clearer, the present invention is further illustrated in detail with the accompanying drawings and the preferred embodiments as follows. It should be understood that the described preferred embodiments herein are only for explaining the present invention, not for limiting the present invention.

First Preferred Embodiment

Referring to FIG. 1(a) and FIGS. 3-5, according to the first preferred embodiment of the present invention, a trenchless method for forming a curved hole channel with a steel sleeve is provided, comprising steps of:

(T1) drilling a straight hole channel, and inserting the steel sleeve 3 into the straight hole channel;

(T2) inserting a guiding pipe 4 into the steel sleeve 3, and determining a bending direction of a hole channel to be formed; and (T3) inserting a flexible steel-wire pipe 5 into the guiding pipe 4, and punching to form the curved hole channel.

In the first preferred embodiment, the guiding pipe is a rubber pipe with a curved tail end.

Particularly, the guiding pipe 4 plays a guiding function for punching, so as to conveniently punch to a specified position, namely a bottom of a subsiding pipeline section 1; therefore, the tail end of the guiding pipe 4 must be curved and has a definite orientation. Moreover, the steel sleeve 3 is straight, and thus the guiding pipe 4 is preferred to be made of rubber.

The flexible steel-wire pipe 5 has a three-layer structure, comprising an inner layer, a middle layer, and an outer layer, wherein: the inner layer and the outer layer are made of Poly Vinyl Chloride (PVC) soft plastic; and the middle layer is steel wires.

Particularly, the flexible steel-wire pipe 5 is mainly for punching and required to have certain hardness. Therefore, in the first preferred embodiment, the flexible steel-wire pipe 5 has the three-layer structure, comprising the inner layer, the middle layer, and the outer layer, wherein: the inner layer and the outer layer are made of PVC soft plastic; and the middle layer is the steel wires. The middle layer of steel wires is for better punching and fixing.

Punching means controlling the flexible steel-wire pipe 5 to drill through an external machine with applying the guiding pipe as direction control, so that the curved hole channel is formed. The above method is able to form the curved hole channel inside the medium in a trenchless way and is convenient to use.

Second Preferred Embodiment

Referring to FIG. 1(a)-FIG. 7, according to the second preferred embodiment of the present invention, a trenchless method for pipeline lifting is provided, comprising steps of:

(S1) detecting a pipeline, and determining a position of a subsiding pipeline section 1;

(S2) selecting a position of a grouting hole 2 at ground of a side of the subsiding pipeline section 1, and extending a hole channel of the grouting hole 2 to a bottom of the subsiding pipeline section 1 with a trenchless method for forming a curved hole channel with a steel sleeve;

(S3) pulling out a flexible steel-wire pipe 5; inserting a grouting pipe 6 into a guiding pipe 4, and then inserting the grouting pipe to the bottom of the subsiding pipeline section 1; and (S4) injecting a polymer material to the bottom of the subsiding pipeline section 1 through the grouting pipe 6, so as to uplift and reset the subsiding pipeline section 1.

Particularly, a specific position of the subsiding pipeline section 1 is firstly detected; after determining the position of the subsiding pipeline section 1, the grouting hole 2 is drilled at one side of the subsiding pipeline section 1; in order to avoid collapse of the grouting hole 2, after successfully drilling the grouting hole, the steel sleeve 3 is inserted into the grouting hole 2, wherein a diameter of the steel sleeve is preferred to be consistent with that of the grouting hole 2; then, the guiding pipe 4 is inserted into the steel sleeve 3; next, the flexible steel-wire pipe 5 is inserted into the guiding pipe 4 for punching conveniently; through punching towards the bottom of the subsiding pipeline section 1 with the flexible steel-wire pipe 5, the curved hole channel is formed, which surrounds the bottom of the subsiding pipeline section 1 for grouting conveniently; after finishing punching, the flexible steel-wire pipe 5 is pulled out, and the grouting pipe 6 is inserted; the grouting pipe 6 is flexible and able to be inserted to the bottom of the subsiding pipeline section 1 with a radian of the grouting hole 2; finally, the polymer material is injected to the bottom of the subsiding pipeline section 1, so as to uplift the subsiding pipeline section 1 and complete the resettlement.

Figure 2:
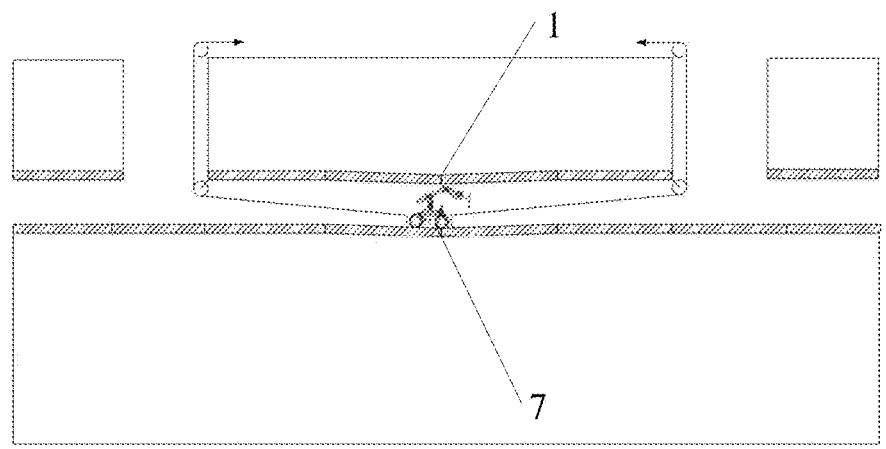
FIG. 2 is a sectional sketch view of a subsiding pipeline section along a pipeline direction according to the present invention.

Referring to FIG. 2, according to the second preferred embodiment, in the step of S1, a device used for detecting the pipeline is a pipeline video robot 7.

Particularly, the main resettlement target of the second preferred embodiment is the small-diameter pipeline which generally represents the pipeline with a nominal diameter smaller than 800 mm. People cannot enter the small-diameter pipeline to check whether a subsidence disease exists. Therefore, the pipeline video robot 7 is required to enter the pipeline and determine the position of the subsiding pipeline section 1.

Figure 3:
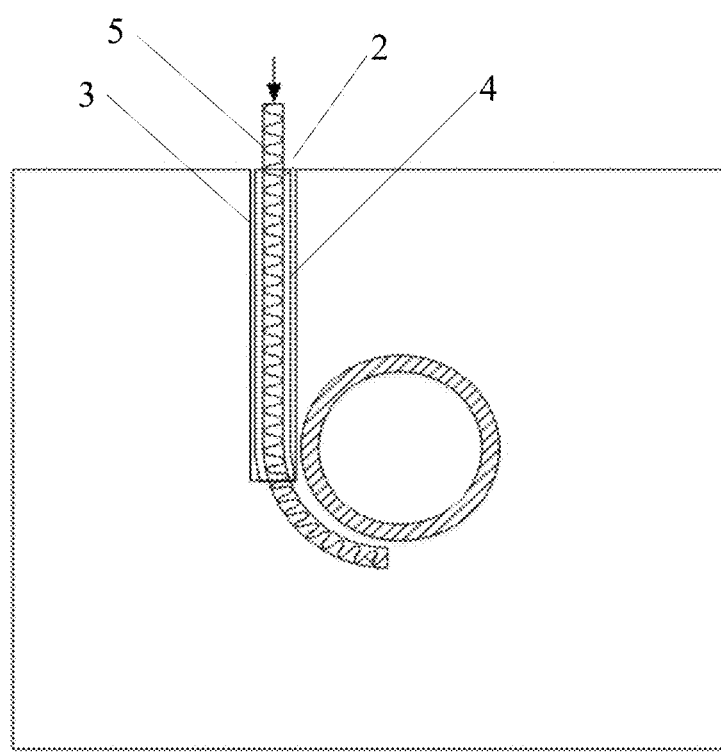
FIG. 3 is a sectional sketch view of a punching operation along a direction vertical to the pipeline according to the present invention.
Figure 4:
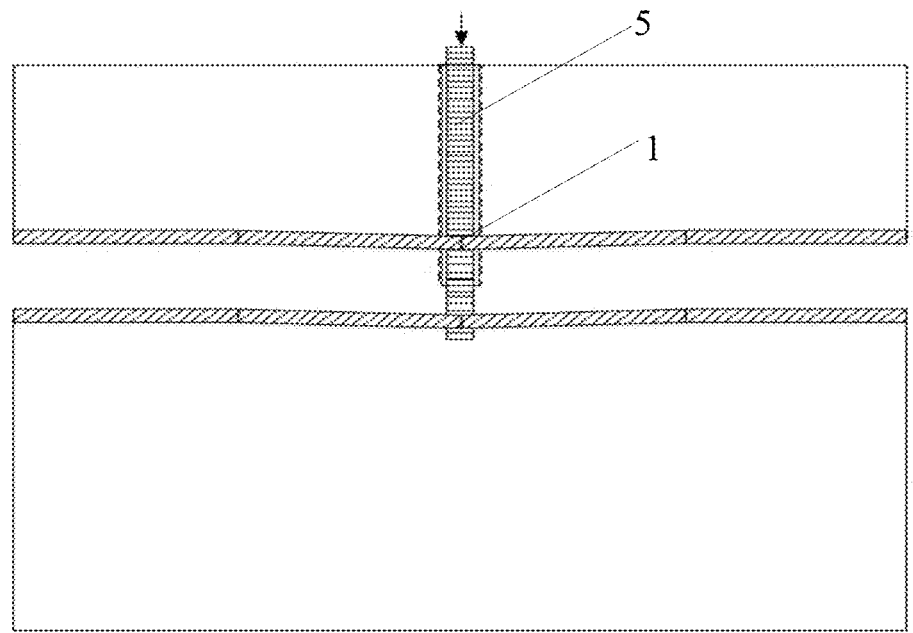
FIG. 4 is a sectional sketch view of the punching operation along the pipeline direction according to the present invention.
Figure 5:
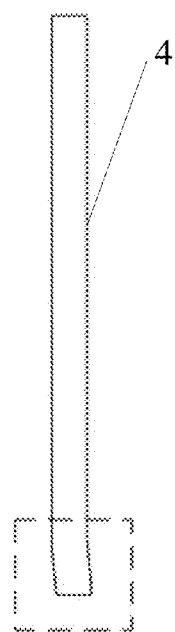
FIG. 5 is a structural sketch view of a guiding pipe according to the present invention.

Referring to FIGS. 3-5, according to the second preferred embodiment, in the step of S2, a depth of the grouting hole 2 is from the ground to a height of a central axis of an outer wall of the subsiding pipeline section 1.

Particularly, when drilling the grouting hole 2, a tail end of the grouting hole 2 is appropriate to reach the height of the central axis of the outer wall of the subsiding pipeline section 1. For subsequent punching, the depth of the grouting hole 2 is extended to the bottom of the subsiding pipeline section 1. If too deep or too shallow, an achieved effect is not good enough. An optimal position of punching is that the depth reaches a position of the central axis.

Figure 6:
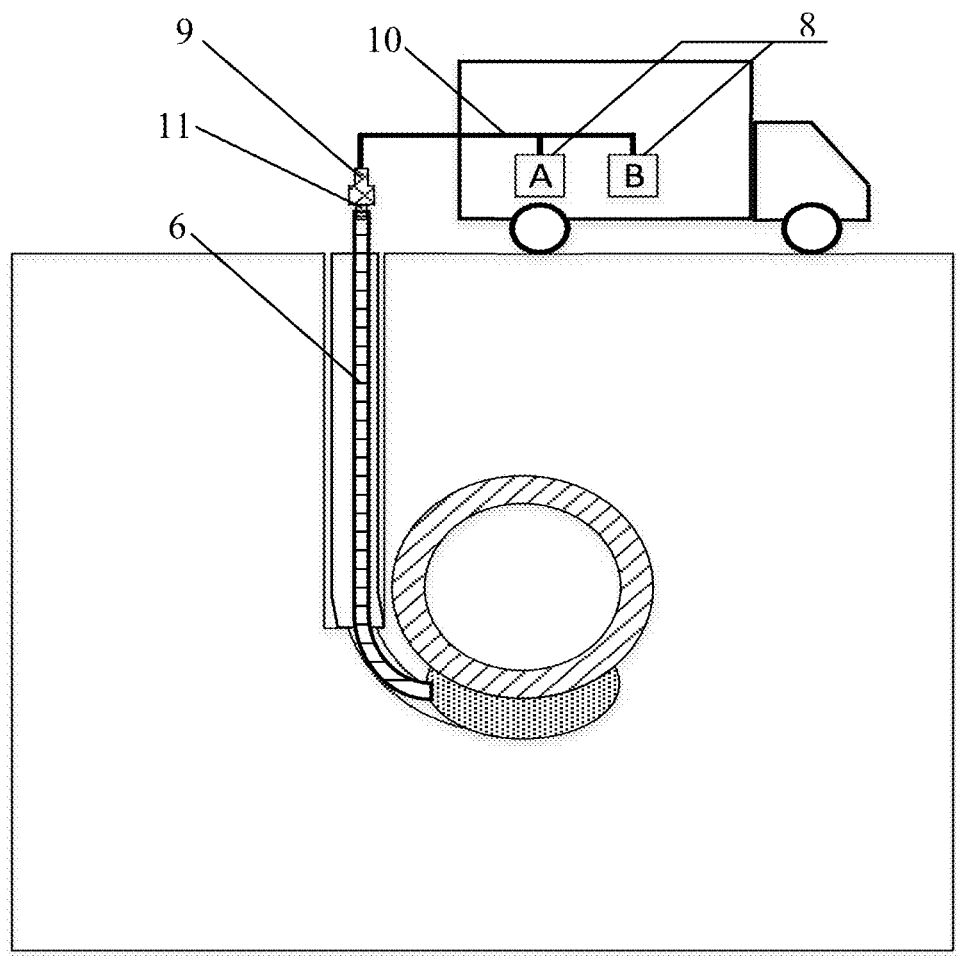
FIG. 6 is a sectional sketch view of a grouting operation along the direction vertical to the pipeline according to the present invention.
Figure 7:
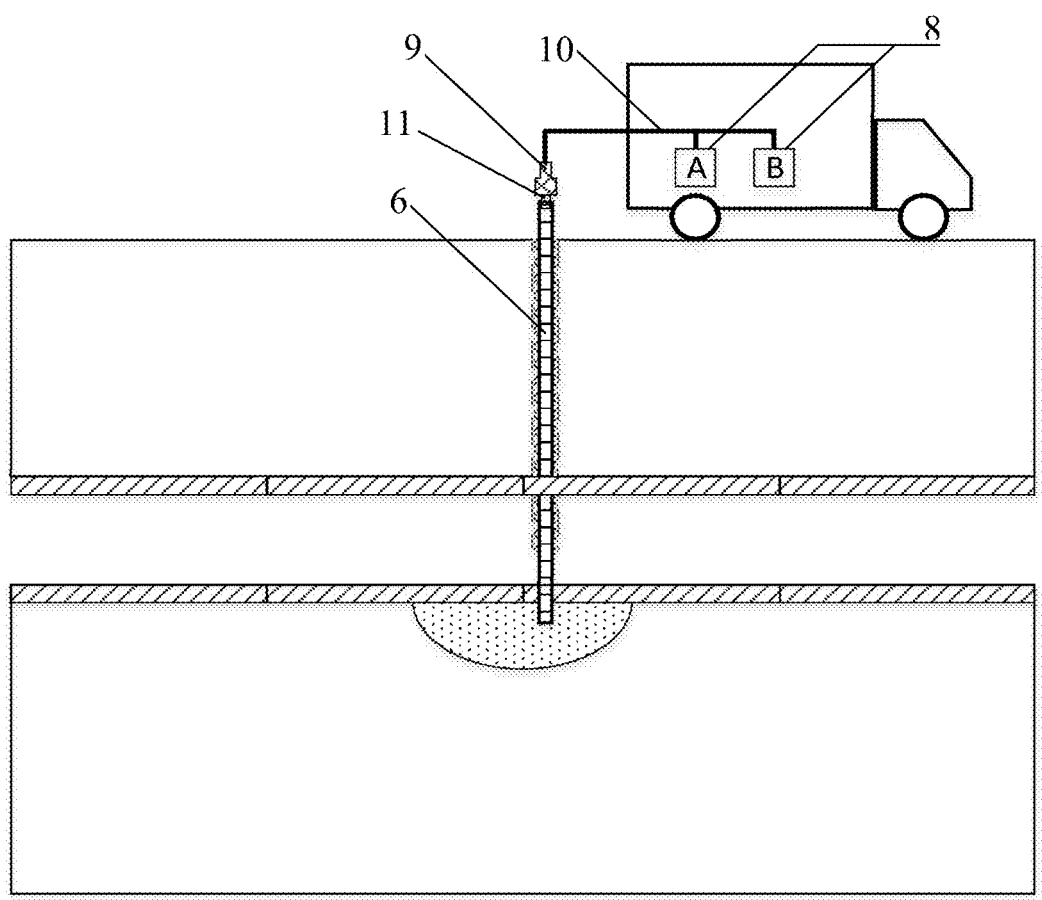
FIG. 7 is a sectional sketch view of the grouting operation along the pipeline direction according to the present invention.

Referring to FIGS. 6-7, according to the second preferred embodiment, in the step of S4, the grouting pipe 6 is a PVC vulcanized rubber flexible pipe.

Particularly, the grouting pipe 6 is for injecting the polymer material to the bottom of the subsiding pipeline section 1. However, a part of the grouting hole 2 is curved. Therefore, only the flexible pipe having certain flexibility can be used. In the second preferred embodiment, the grouting pipe 6 is the PVC vulcanized rubber flexible pipe.

Furthermore, according to the second preferred embodiment, the step of S4 particularly comprises steps of:

(S41) injecting the polymer material to the bottom of the subsiding pipeline section 1 through the grouting pipe 6 by a grouting device 8; and (S42) filling a subsidence area with the polymer material, then expanding and solidifying, and gradually uplifting the subsiding pipeline section 1 by an expansion force thereof.

In the above step of S41, a grouting head is connected between the grouting device 8 and the grouting pipe 6.

Particularly, a detailed process of uplifting the subsiding pipeline section 1 is described above. The grouting device 8 is used to inject the polymer material to the bottom of the subsiding pipeline section 1. At this time, good sealing between the grouting device 8 and the grouting pipe 6 is required. Therefore, the grouting head is used for connection. The grouting head is mainly for sealing the connection between the grouting device 8 and the grouting pipe 6.

Furthermore, the grouting head comprises a fixing clamp 9, a grouting device connection pipe 10 and a grouting connection pipe 11, wherein: the grouting device connection pipe 10 is connected with the grouting device 8; and the grouting connection pipe 11 is connected with the grouting pipe 6.

Particularly, the fixing clamp 9 is for better fixing the grouting device connection pipe 10 and the grouting connection pipe 11, so as to realize a fixing function during grouting.

Furthermore, according to the second preferred embodiment, the trenchless method for pipeline lifting further comprises steps of:

(S5) after completing resettlement of the subsiding pipeline section 1, reinforcing and stabilizing surrounding soil of the subsiding pipeline section 1; after completing reinforcing, successively taking out the grouting pipe 6, the guiding pipe 4 and the steel sleeve 3 from the grouting hole 2; and grouting for sealing the grouting hole 2.

Particularly, after resetting the subsiding pipeline section 1, in order not to affect the original position, corresponding treatment works should be made; that is to say, the grouting pipe 6, the guiding pipe 4 and the steel sleeve 3 are taken out from the grouting hole 2, and then the grouting hole 2 is sealed through grouting, wherein grouting herein means pouring the cement grout into the grouting hole 2, so as to seal the grouting hole 2.

It should be noted that: although the present invention mainly aims at solving the resettlement technology for the small-diameter drainage pipeline, but also applicable to the resettlement for the large-diameter drainage pipeline.

It should be understood that: for one of ordinary skill in the art, equivalent replacements or modifications can be made based on the technical solutions of the present invention and the inventive concepts thereof, which should be all encompassed in the protection scope of the claims of the present invention.

What is claimed is:

1. A trenchless method for pipeline lifting, the method comprising steps of:
    (S1) detecting a pipeline, and determining a position of a subsiding pipeline section;
    (S2) drilling a grouting hole at one side of the subsiding pipeline section, inserting a steel sleeve into the grouting hole, inserting a guiding pipe into the steel sleeve, inserting a flexible steel-wire pipe into the guiding pipe, and forming a curved hole channel by punching towards a bottom of the subsiding pipeline section with the flexible steel-wire pipe, wherein the curved hole channel surrounds the bottom of the subsiding pipeline section;

(S3) pulling out the flexible steel-wire pipe; inserting a grouting pipe into the guiding pipe, and then inserting the grouting pipe to the bottom of the subsiding pipeline section; and (S4) injecting a polymer material to the bottom of the subsiding pipeline section through the grouting pipe, so as to uplift and reset the subsiding pipeline section.

2. The trenchless method for pipeline lifting, as recited in claim 1, wherein: in the step of S1, a device used for detecting the pipeline is a pipeline video robot.

3. The trenchless method for pipeline lifting, as recited in claim 1, wherein: in the step of S2, a depth of the grouting hole is from ground to a height of a central axis of an outer wall of the subsiding pipeline section.

4. The trenchless method for pipeline lifting, as recited in claim 1, wherein: the step of S4 particularly comprises steps of:

(S41) injecting the polymer material to the bottom of the subsiding pipeline section through the grouting pipe by a grouting device; and (S42) filling a subsidence area with the polymer material, then expanding and solidifying the polymer material, and gradually uplifting the subsiding pipeline section.

5. The trenchless method for pipeline lifting, as recited in claim 4, wherein: in the step of S41, a grouting head is connected between the grouting device and the grouting pipe.

6. The trenchless method for pipeline lifting, as recited in claim 5, wherein: the grouting head comprises a fixing clamp, a grouting device connection pipe and a grouting connection pipe; the grouting device connection pipe is connected with the grouting device; and the grouting connection pipe is connected with the grouting pipe.

7. The trenchless method for pipeline lifting, as recited in claim 1, further comprising steps of:

(S5) after completing resettlement of the subsiding pipeline section, reinforcing and stabilizing surrounding soil of the subsiding pipeline section; after completing reinforcing, successively taking out the grouting pipe, the guiding pipe and the steel sleeve from the grouting hole; and grouting for sealing the grouting hole.

* * * * *